United States Patent [19]
Burke et al.

[11] Patent Number: 5,245,626
[45] Date of Patent: Sep. 14, 1993

[54] MULTI-STABLE CAVITY PROCESSOR

[75] Inventors: Steven M. Burke; Charles F. Hester, both of Huntsville, Ala.

[73] Assignee: Teledyne Industries, Inc., Los Angeles, Calif.

[21] Appl. No.: 678,706

[22] Filed: Apr. 1, 1991

[51] Int. Cl.$^5$ .............................................. H01S 3/08
[52] U.S. Cl. ........................................ 372/92; 372/29; 372/19; 372/20; 372/99; 372/26; 372/103; 372/97; 372/108
[58] Field of Search ................. 359/107, 27; 372/33, 372/91, 109; 369/713

[56] References Cited

U.S. PATENT DOCUMENTS

| | | | |
|---|---|---|---|
| 4,715,689 | 12/1987 | O'Meara et al. | 372/21 |
| 4,720,176 | 1/1988 | Klein et al. | 372/21 |
| 4,734,911 | 3/1988 | Bruesselbach | 372/29 |
| 5,038,359 | 8/1992 | Pepper et al. | 372/21 |

Primary Examiner—Leon Scott, Jr.
Attorney, Agent, or Firm—Beveridge, DeGrandi, Weilacher & Young

[57] ABSTRACT

In accordance with the present invention, an optical processing device and method are provided for processing with extremely low energy requirements. Spontaneous emissions from an excited optical gain medium generate a waveform that propagates within a cavity defined by the gain medium and a reflective device. A first spatial modulating element is disposed in the cavity in the path of the generated wavefront to impose a first spatial pattern thereon. A second spatial modulating element also is disposed in the cavity and imposes a second spatial pattern on the perturbed wavefront carrying the first pattern. When the first and second imposed spatial patterns have dual spatial pattterns, light is directed back along pathways through the cavity to induce stimulated emission and eventually resonance in the cavity.

21 Claims, 5 Drawing Sheets

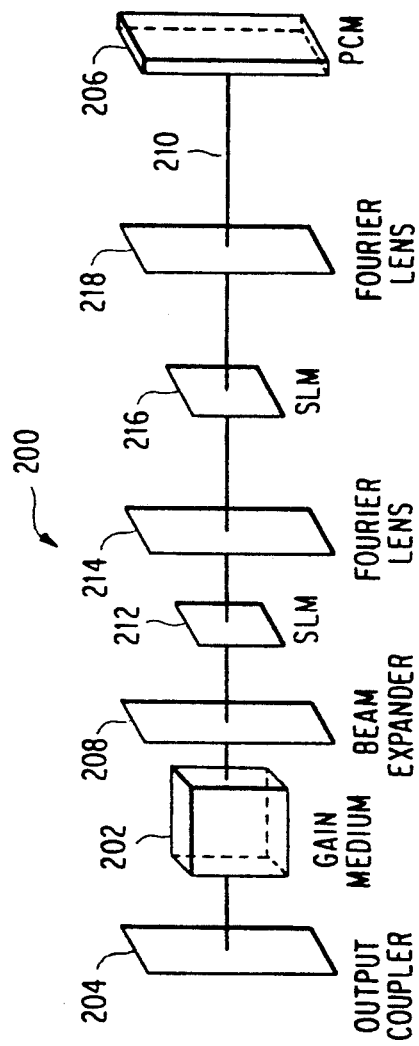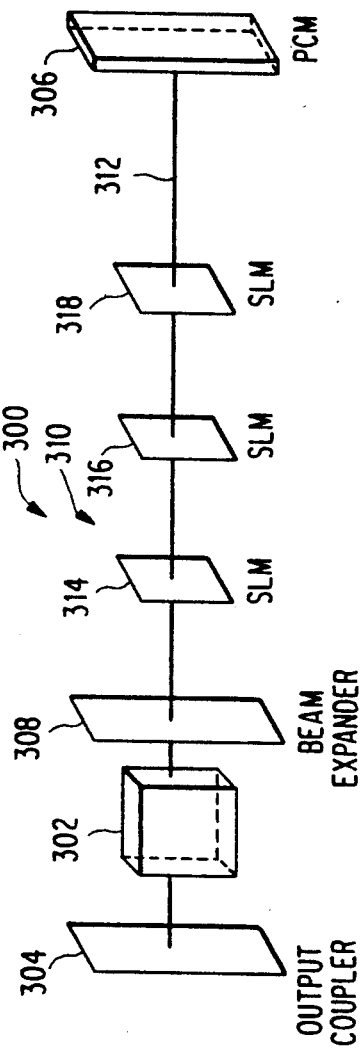

MULTI-STABLE CAVITY PROCESSOR

BACKGROUND OF THE INVENTION

The present invention relates to an extremely low energy optical processor and a method of optical processing. More particularly the processor of the present invention comprises an optical cavity defined by an optical gain medium excitable to population inversion, first and second means for imposing spatial patterns on wavefronts generated by the gain medium, and reflective means for reflecting light back to the gain medium to induce stimulated emission therein when the spatial, patterns imposed by each of the first and second means have dual spatial patterns.

Prior art optical computers have utilized coherent light provided from laser light sources which are external to the computation system. The externally-provided light is used for making the desired computations. Light from the external source is fed into the system and thereafter the computations are performed. Well known optical computing devices such as coherent optical correlators are examples of such prior art systems. Diffraction of laser light is exploited to compute Fourier transforms, correlations, convolutions, and to perform general transformations through the interconnections provided by the externally-generated light.

Where the laser source is external, it is held or pulsed at substantially full lasing power and the "lasing" photons are sent to the full computation path. Power requirements for operating such prior art systems thus depend upon the total computation power requirements and "laser beam waves". Power requirements are heavily dependent upon the size of the system. For example, power requirements for prior art laser-based, active sensors are larger because gain is provided external to the elements accomplishing detection and computation. In such prior art laser active sensors, full laser power is generated for illuminating the object under observation. Special detection by heterodyning and subsequent post processing are state of the art for known active sensors.

Intra-cavity modulation has been used in mode-locked and Q-pulsed laser systems. Such devices have been employed in for example, communications, radar systems, weaponry systems and other applications. For example, U.S. Pat. No. 4,658,146 relates to a laser apparatus with an extended cavity in which an information bearing medium intercepts a standing wave generated within the laser cavity. The system of U.S. Pat. No. 4,658,146 is described as switching in and out of lasing mode operation as the surface of the information bearing medium is moved to bring changing magnetic domains. As such, information encoded as the timing between domain changes can be recovered by monitoring laser operation or nonoperation.

U.S. Pat. No. 3,657,510 relates to a Q-switched laser for vaporizing or otherwise altering the surface of a target object according to a given pattern. In this regard, U.S. Pat. No. 3,657,510 discloses a laser cavity which is defined between a full mirror and a partial mirror, and which includes a laser medium, a Q-switch, and a mask. A laser medium is pumped into stimulated emission. According to U.S. Pat. No. 3,57,510, the stimulated emission occurs only at cross-sectional portions of the laser material that correspond to the pattern of the mask, whereby the resulting laser beam has a cross-section corresponding to the pattern when it strikes the surface of the target object.

SUMMARY OF THE INVENTION

An extremely low energy optical cavity processor and method of optical processing are provided in accordance with the present invention. In accordance with the present invention, the necessary energy requirements for processing or computation are low as the optical gain medium in the system of the invention need be excited only to the extent that it begins to fluorescence. Then, the presence or absence of resonant conditions within a cavity containing such gain medium provides the results of various different types of computations which include, but are not limited to, pattern recognition, correlation, convolution, and various transformations.

The gain medium which when excited into a state of population inversion generates a wavefront which propagates along an optical path within the cavity. That is, the gain medium is excited to fluorescence conditions. Two separated elements also are present within the cavity for "perturbing" or imposing spatial patterns on the wavefront generated by the fluorescing gain medium. A first spatial modulating element imposes a first spatial pattern on the wavefront generated by the gain medium. The light pattern resulting from perturbation of the wavefront by the first modulating element can be thought of as a computational layer. Thereafter, a second modulating element, also disposed within the optical path, imposes a second spatial pattern on the wavefront having the first spatial pattern imposed thereon by the first modulating element.

Reflecting means are also provided to define the optical cavity with the gain medium, the first spatial modulating element, and the second spatial modulating element. When the pattern imposed by the first spatial modulating element has a spatial pattern possesssing duality with the light pattern imposed by the second spatial modulating element, the reflecting means reflects light back through the optical train along distinct paths defined by the two spatial modulating elements. Any reflected photons thereafter will induce stimulated emission in the gain medium. Thus, the perturbed wavefront produced by transmission through an optical train defined by the gain medium, spatial modulating elements, and reflecting means results in a light pattern formed by reinforcement and cancellation of perturbed wavefronts. Where the spatial modulating elements are embodied by two spaced-apart spatial light modulators, a successful transit by spontaneously emitted photons through the optical train, and back to the gain medium to generate stimulated emission, defines a correlation path through the optical cavity. The extent of stimulated emission induced in the gain medium is proportional to the number of photons which successfully traverse optical paths through the cavity. Successfully traversing photons induce stimulated emissions in the gain material as they traverse the same paths, whereby resonant modes build in the cavity. Resonance within the cavity can be detected by optical coupling means such a photodetector arrangement placed in communication with the cavity. Alternatively, resonance may be detected by monitoring current and/or voltage characteristics across the gain medium.

In the preferred embodiments, the first modulating element comprises a two dimensional spatial light modulator. The second modulating element can comprise a transmissive spatial light modulator. Alternatively, the second modulating element could comprise a phase conjugate reflecting means formed of individual phase conjugate mirrors mounted so as to impose a second spatial pattern on the wavefront emerging from the first spatial light modulator. Where both the first and second spatial modulating elements comprise transmissive spatial light modulators, as described in connection with one of the preferred embodiments, two mirror means are all that is required to define the boundaries of the optical cavity. Preferably these mirror means comprise a phase conjugate mirror.

It is contemplated that a shutter also could be provided within the cavity for selectively opening and closing the optical train. The shutter could be provided by another spatial light modulator, or any birefringent, magnet-optic, acousto-optic, photorefractive, photochromic or electro-optic device for quickly switching between open and closed conditions. In the preferred embodiments, the shutter is open for a minimum time required for the detection of resonance within the cavity. One this detection is made, the shutter can be closed.

In accordance with the present invention a low energy optical processing apparatus comprises: (a) a gain medium excitable into a state of population inversion to spontaneously emit photons along an optical path to generate a wavefront; (b) first means, disposed within the optical path for imposing a first spatial pattern on a wavefront generated by the gain medium; (c) second means, disposed within the path, for imposing a second spatial pattern on a wavefront having a first spatial pattern imposed thereon by the first means; and (d) means, defining an optical cavity with the gain medium, the first means and the second means, for reflecting light back to the gain medium along the optical path to induce stimulated emission in the medium when the first spatial pattern and the second spatial pattern possess duality.

Further in accordance with the present invent an extremely low energy processing method utilizing an optical cavity defined by a gain medium and two reflective means comprises the steps means of: (a) exciting the gain medium into a state of population inversion so that medium spontaneously emits photons to generate a wavefront propagating along an optical path within the cavity; (b) in the cavity, imposing a first spatial pattern on the wavefront to provide a patterned wavefront; (c) in the cavity, imposing a second spatial pattern on the patterned wavefront; and (d) detecting in the gain medium, the presence or absence of stimulated emission induced by light reflected from one of the reflective means.

BRIEF DESCRIPTION OF THE DRAWINGS

Further aspects and features of the present invention will be even more apparent from the following detailed description and drawings, and the appended claims. In the drawings:

FIG. 7 is a schematic diagram of another embodiment of the optical processor according to the present invention; and FIG. 8 is a schematic diagram of yet another embodiment of an optical processor in accordance with the present invention.

DETAILED DESCRIPTION OF THE PREFERRED EMBODIMENTS

Figure 1:
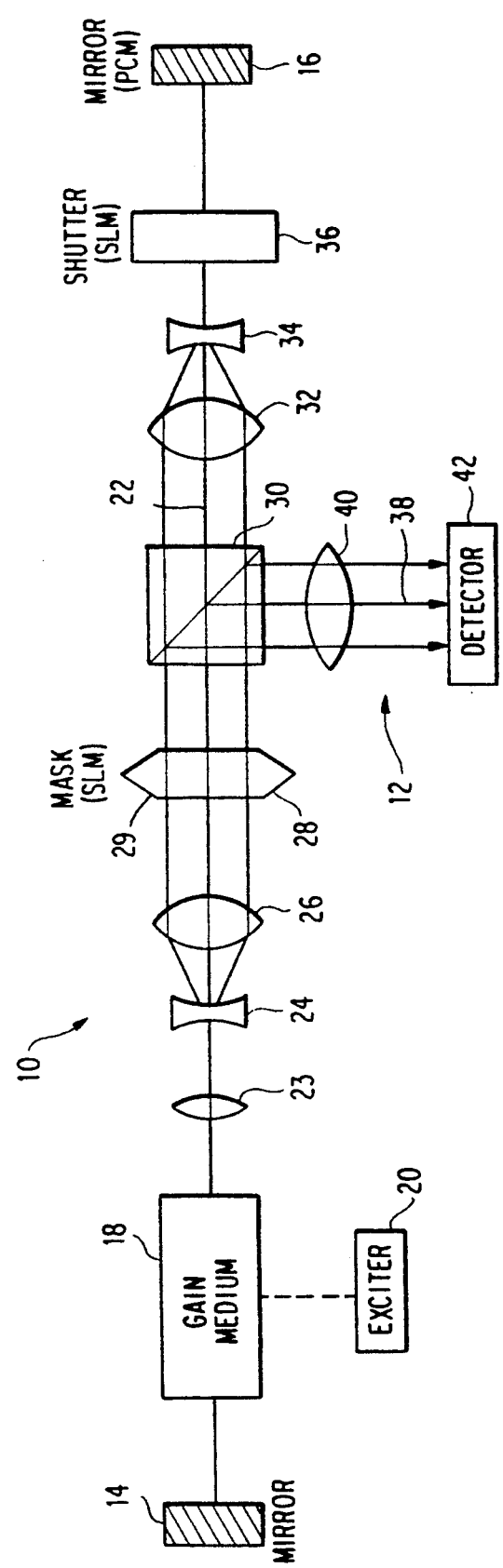
FIG. 1 is a schematic diagram of a preferred embodiment of an optical processor according to the present invention.

FIG. 1 is a block diagram showing a first embodiment of the low energy processor in accordance with the present invention. In FIG. 1, processor 10 is shown in conjunction with a photodetection arrangement 12. Preferred processor 10 is completely implemented by optical elements. As shown, processor 10 comprises a resonance cavity defined by mirrors 14 and 16 and a gain medium 18. Any suitable pumping or exciting means 20 is provided for energizing the gain medium 18 and so the exciter is chosen according to what type of lasing medium is utilized in processor 10. Exciter 20 excites the gain medium 18 into a pre-lasing state of population inversion. Preferably, the gain medium is excited to the extent that it just begins spontaneously emitting radiation, i.e. fluorescence.

Gain element 18 can comprise any conventional lasing cell. Solid state laser diodes are preferable due to their high efficiency, small size, and broad band output. However, it is contemplated that many other lasing materials can be used.

In the embodiment of FIG. 1, mirrors 14 and 16 are each fully reflecting. However, as will be understood, the placement of photodetection arrangement 12 is arbitrary and FIG. 1 merely shows one possible position for the photodetection arrangement. For example, as an alternative, mirror 16 could be made to have less-than-unity reflectivity and the photodetection arrangement therefore could be disposed behind such a partially reflective mirror. Indeed, it will be understood that processor 10 does not require a photodetection arrangement to actually perform any of its computations, and arrangement 12 is necessary only for interface with the outside world.

The resonance cavity of processor 10 has an optical axis which, for convenience, is identified by reference numeral 22. A first lens 23 focuses spontaneously emitted light through a lens unit comprising a concave lens 24 and a convex lens 26 along optical axis 22 onto a mask 28 which provides the computational algorithm under operation. It will be appreciated that as used in connection with the present invention, the term "computation" refers to any of numerous operations which could be performed by the disclosed processor 10. Such computations include but are not limited to pattern recognition, correlation, convolution, and transformations.

Light emerging from mask 28 passes through a beam splitter B/S 30 to a like lens unit comprising a convex lens 32 and a concave lens 34. A shutter 36 is provided between concave lens 34 and mirror 16. The positions of lenses 24, 26, 32, and 34 within the resonance cavity are arbitrary. These lenses do not affect the computations performed by processor 20 and are present only to adjust the beam by expanding or reducing the beam width in accordance with the dimensionality and size of mask 28. Gain medium 18 and lens 23 may be positioned within the cavity in any order. The position of the shutter 36 likewise is arbitrary in the cavity. If desired, additional mirrors and lenses could be used to fold or bend the cavity according to a given linear dimension without affecting the capabilities of processor 10.

A portion of the light passing through mask 28 is directed to the photodetection arrangement 12 by beam splitter 30. Beamsplitter 30 may have, for example, 98% transmittivity along optical axis 22 and have 2% reflectivity along transverse optical axis 38. As shown in FIG. 1, photodetection arrangement 12 comprises a lens 40 and a photodetector 42 for sampling output from processor 10. Conventional photomultiplier tubes, avalanche diodes and the like will suffice as the photodetector 42. Very high sensitivity is important in sensing the contemplated low level light output.

In the preferred embodiments, mask 28 comprises a transmissive spatial light modulator SLM 29. In the embodiment of FIG. 1, the spatial light modulator 29 providing mask 28 is considered to be two-dimensional. However, as is appreciated by one of ordinary skill in the art, the SLM embodying mask 28 could be one-dimensional, or could be considered to approximate a point. Appropriate relaying lenses can be positioned within the optical cavity to accommodate different dimensionalities of the SLM forming mask 28. It is also appreciated that while a transmissive spatial light modulator provides mask 28 in the embodiment of FIG. 1, a reflective SLM likewise would be suitable. Further still, mask 28 could comprise magneto-optic, acousto-optic, or electro-optic devices or devices comprising birefringent, photorefractive, or photochromatic materials, frequency-controlled non-linear devices, or holographic memory elements. Shutter 36, like mask 28, also could comprise any spatial light modulating device.

Processor 10 could be thought of as performing computations encoded by mask 28 while shutter 36 is closed. As soon as the gain medium 18 is excited, a portion of the spontaneous photons emitted from the medium acquire the information of mask 28. Mask 28 continuously perturbs wavefronts defined by spontaneously emitted photons along axis 22 to produce a perturbed or encoded wavefront. When shutter 36 is opened, the perturbed wavefronts pass through beamsplitter 30, and shutter 36 along optical axis 22 to mirror 16.

Figure 2:
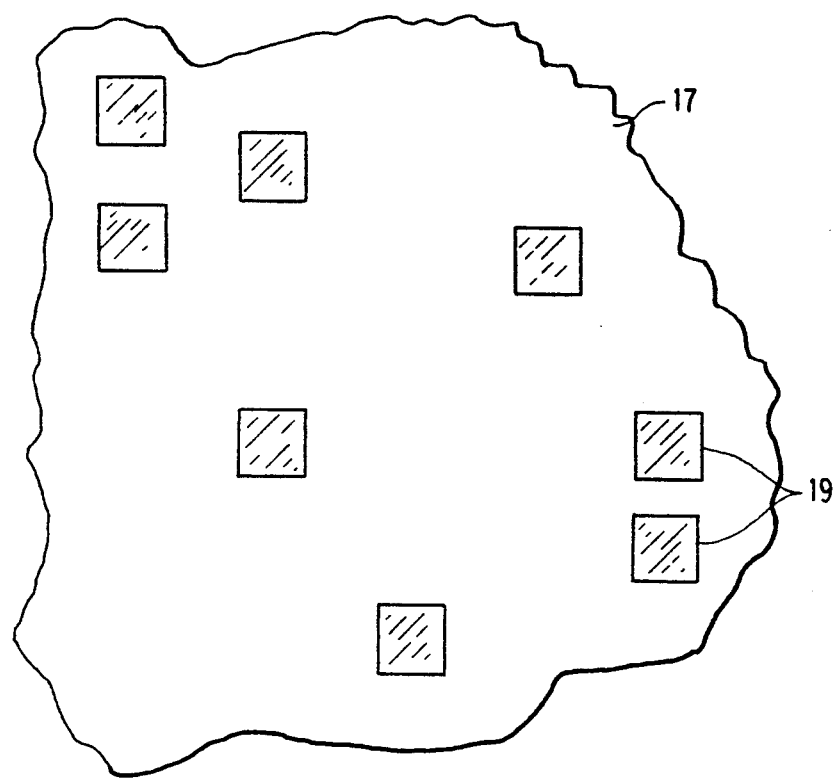
FIG. 2 is a schematic illustration of a phase conjugate mirror means suitable for use in the embodiment of FIG. 1.

With reference to FIG. 2, a portion of preferred mirror 16 is illustrated as comprising an array of independent, small reflecting members 19 which each comprise a phase conjugate material. Accordingly, mirror 16 hereinafter will be referred to as phase conjugate mirror PCM 17. Reflecting members 19 are positioned to most strongly reflect a particular or characteristic spatial pattern or patterns. PCM 17 thus time-reverse reflects particular wavefront patterns incident thereon in dependence upon how closely the incident wavefront matches the characteristic pattern or patterns of the PCM. Incident wavefront patterns which differ substantially from the characteristic pattern of PCM 17 will be only weakly reflected or not reflected by the PCM.

It follows that when shutter 36 is opened, if the perturbed wavefront formed by mask 28 substantially matches a characteristic wavefront pattern of PCM 17, photons defining the perturbed wavefront pattern will be time-reverse reflected back through the open shutter by the PCM. Light reflected by PCM 16 can be considered as carrying the results of computation back along optical axis 22 to the gain medium 18 to cause amplification in the medium. Gain medium 18 interacts with the perturbed wavefront reflected by PCM 17 as the reflected wavefront passes through the medium, generally along optical axis 22. Thus, the time-reversed, reflected perturbed wavefront interacts with the gain medium 18 to produce gain or increased stimulated emissions having the same propagation characteristics. This intensity amplified wavefront is reflected by full mirror 14 back through the gain medium to be further amplified with each subsequent reflection. Such amplification continues in the cavity as long as shutter 36 remains open. Preferably shutter 36 remains open for a minimum period permitting resonance within the cavity of processor 10. Resonant operation is desirable because it provides for increased response to wavefront perturbations by mask 28, increased stimulated emissions, and relative decrease of noise in the gain medium.

Figure 3A:
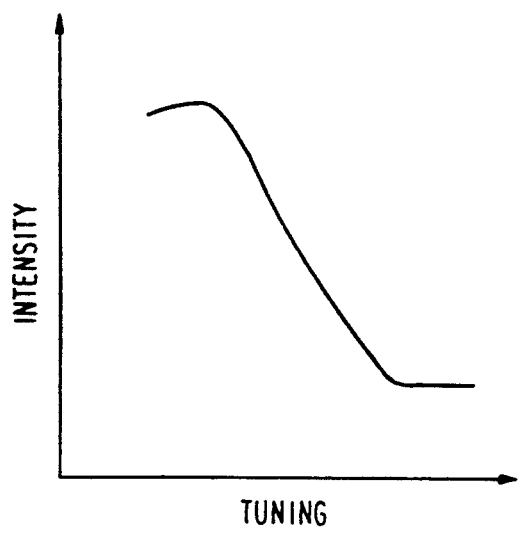
FIGS. 3A and 3B are graphical representations useful in understanding intensity response as a function of tuning.
Figure 3B:
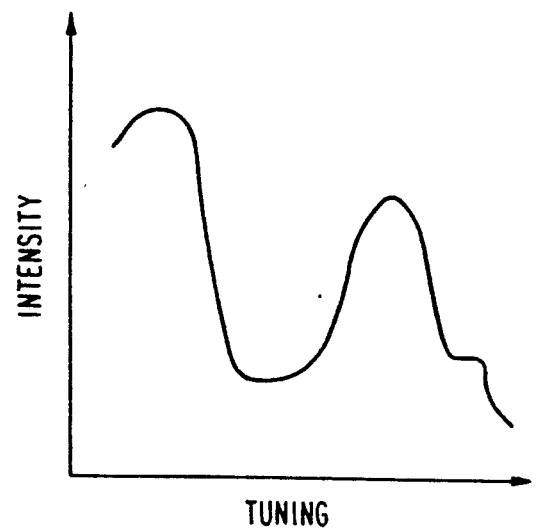
Figure 4:
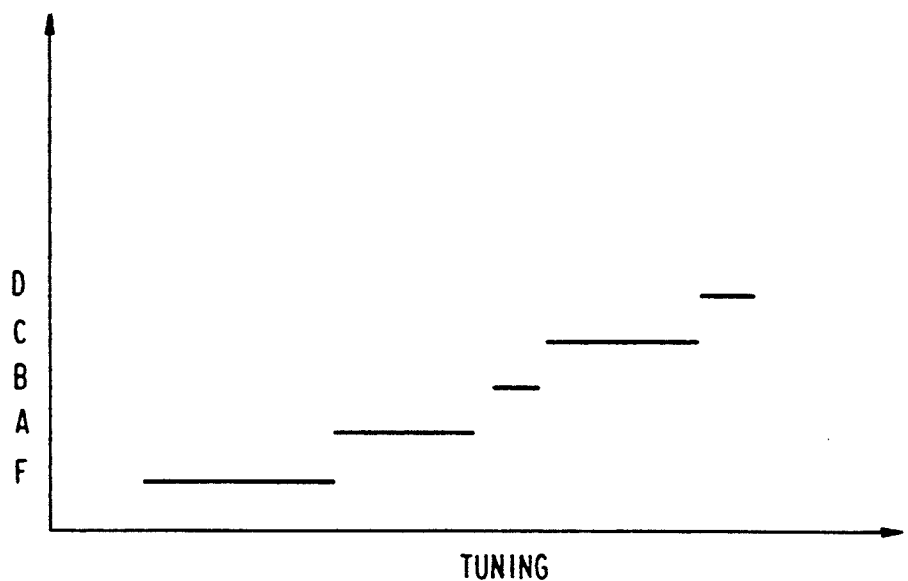
FIG. 4 is a graphical depiction of spectral line selection as a function of tuning.

For operation, it is contemplated that the cavity is tuned to have a stability point at which it produces a single frequency in the absence of perturbing mask 28. Different stability points can be selected depending upon the different wavelengths and amplitudes at which the gain media lases. The stability point could be made to reside in the fundamental mode, or alternatively, in some non-fundamental mode. As noted from FIGS. 3(A) and 3(B), such stability point may reside within linear or nonlinear regions of intensity response to perturbation magnitude. A tuned or neutral stability point can be maintained by mode-locking or by electromechanical elements as appreciated by those of ordinary skill in the art. Verification of the cavity stability point can be made by spectral line analysis and/or amplitude response. FIG. 4 depicts spectral line selection as a function of tuning. Also, as is appreciated, changing spectral lines usually results in significant changes in output intensity. It is also kept in mind that one cavity can produce multiple lines simultaneously. When mask 28 is introduced into the optical cavity, the cavity is detuned from its selected stability point. Accordingly, it is contemplated that resonance within the cavity will occur at a frequency or frequencies different from that to which the cavity is tuned.

While shutter 36 remains open, amplified stimulated emission eventually becomes detectable by photodetection arrangement 12. Different criteria may be used in evaluating the computation results as sensed by photodetection arrangement 12. A first such evaluation method is based upon time sequence. Photon arrival statistics at detector 42 depend upon the structure of mask 28. Therefore, a time record of photon counts identifies the perturbation encoded by the mask. Thus, in operation, shutter 36 is opened to complete the optical path between mirrors 14 and 16 for a minimum amount of time necessary to achieve adequate amplification stimulated emission wherein "adequate amplification stimulated emission" is defined as the generation of statistically significant numbers of photons. As stated previously, this statistically significant condition is achieved when sustained resonance occurs within the cavity of processor 10. Thusly, lasing conditions within the cavity automatically perform thresholding for output from processor 10. Alternatively, if desired, smaller numbers of photons could provide the basis for analyzing the computation results depending upon the desired confidence level in the results.

A second output characterization relies upon emitted photon displacement transverse to the axis 22 of the optical cavity of processor 10. The lobe structure of the stimulated emission varies with the perturbation encoded by mask 28. Time records of photon arrival at each lobe zenith further can specify the output.

Thirdly, spectral classification is contemplated. Here, the amplified simulated emissions could be directed through a grating prism. Frequency components of the amplified simulated emissions are spatially separated and again, time records of photon arrival at each band can further categorize the output.

Figure 5:
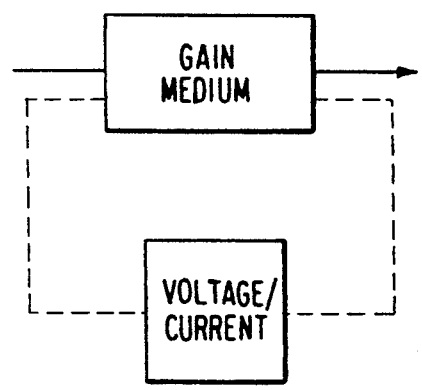
FIG. 5 is a block diagram illustrating characterization of cavity condition by monitoring voltage/current parameters in the gain medium.

Methods other than optical methods can be used detection of resonant or nonresonant conditions within the cavity. For instance, as shown in FIG. 5, a voltage and/or current measuring device 70 can be connected across the gain medium 72 to detect internal conditions therein. The voltage across gain medium 72 varies depending upon the extent of stimulated emission induced therein by light reflected back through the cavity when the characteristic spatial patterns possess duality.

Computation by processor 10 is extremely energy efficient. Information is encoded on a perturbed wavefront, and, in the preferred embodiments, calculation and readout are accomplished by obtaining resonance in the cavity. Since resonance will occur only when the perturbed wavefront encoded by mask 28 substantially matches one of the characteristic spatial patterns of PCM 17, it is understood that gain is provided only in response to selected results which depend upon the mask. Accordingly, processor 10 operates at extremely low power because gain is needed only when shutter 36 is open to provide sufficient amplification to carry out a read operation at photodetector 40. Indeed, it may be said that gain is not required during performance of the computations by the interaction of spontaneously emitted photons with mask 28, but only during a read operation when amplification is necessary for detecting the presence or absence of a perturbed wavefront at photodetector 42.

Figure 6:
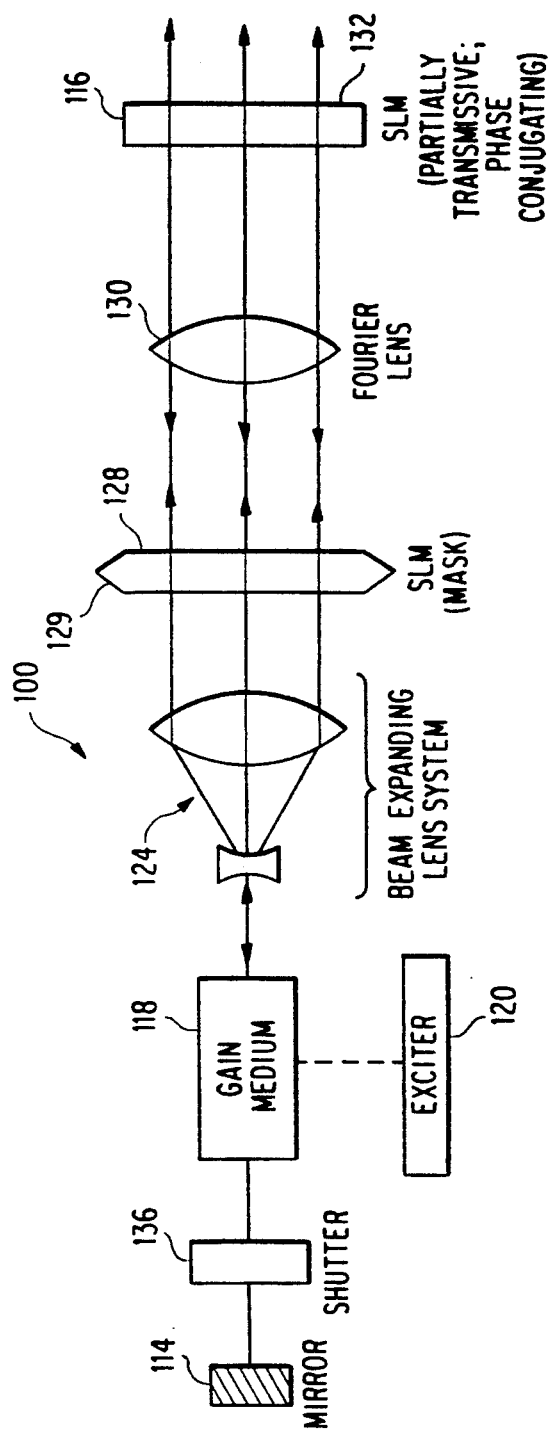
FIG. 6 is a schematic diagram of an alternate embodiment of an optical processor in accordance with the present invention provided as a linear cavity, multi-stable pattern recognition system.

Reference is made to FIG. 6 in describing an alternative embodiment of a processor in accordance with the present invention which operates as a linear-cavity, multi-stable pattern recognition system. System 100 is noted to be similar to processor 10 and to likewise includes a fully reflective rear mirror 114 and a front phase conjugate reflective element 116, which together with a gain medium 218, define an optical cavity having an optical axis 122. An exciter 120 is shown for pumping the gain medium 118 to provide a desired level of spontaneous emission. A lens system 124 appropriately adjusts the beam width in the defined optical cavity.

In the embodiment of FIG. 6, a transmissive SLM 129 likewise provides a mask 128 for encoding a particular pattern or patterns on spontaneously emitted photons from gain medium 118. A reflective SLM 132 provides the phase conjugate reflective element 116 and is programmed to most fully reflect a selected transformation pattern or patterns representative of a pattern or patterns to be recognized. Transformation of the perturbed wavefront passed by mask 128 is effected by a Fourier lens 130 disposed between the mask and SLM 132. Reflective SLM 132 sends recognized photons back along optical path 122 through the gain medium 118. When shutter 136 is open, gain by medium 118 can be sensed behind reflective SLM 132 which can be partially transmissive.

FIG. 7 shows another embodiment of the processor in accordance with the present invention. In the embodiment of FIG. 7, the processor 200 has an optical cavity defined by gain medium 202, output coupler 204, and PCM 206. In processor 200, it will be understood that PCM 206 can be a solid mirrored surface. A beam expanding element 208 is disposed along the optical axis 210 defined through the gain medium 202. A transmissive SLM 212 is provided between the beam expander 208 and a Fourier lens 214 which is located one focal length away from the SLM 212. A second transmissive SLM 216 is located one focal length from each of Fourier lens 214 and a second Fourier lens 218.

In the operation of processor 200, the gain medium 202 likewise is excited into fluorescence. Spontaneous emissions from the medium are expanded by the beam expander 208 in order to illuminate SLM 212. SLM 212 imposes a spatial pattern on the illuminating light from the gain medium 202 by selectively permitting transmittance through pixels defined by the two-dimensional face of the SLM. Again, the resulting pattern of light can be thought of as a perturbed wavefront, or as a computational layer. The light pattern transmitted through SLM 212 is collected by the Fourier lens 214. Fourier lens 214 forms another light pattern which is the Fourier transform of the light pattern transmitted through SLM 212. The transformed light pattern emerging from lens 214 is imaged onto SLM 216 wherein the incident waveform is perturbed further if it propagates through the second SLM 216. It can be thought that the original transformed computational layer defined by SLM 212 and lens 214 is compared to a second computational layer defined by SLM 216. Thereafter, light transmitted through SLM 216 is collected at the second Fourier lens 218 which forms another transformed pattern that, in turn, is imaged onto PCM 206.

Transmission along optical train 200 forms a light pattern by reinforcing and cancelling perturbed wavefronts. For optical path or train 200 comprising SLMs 212, 216 and Fourier lenses 214, 218 which are located one focal length apart, photons which successively arrive at PCM 206 for reflection define a correlation path. Then, PCM 206 time-reverse reflects the incident light pattern whereby photons incident on the PCM are reflected to traverse their original paths in reverse order. As explained in the foregoing, all photons reflected by PCM 206 will propagate in paths generally along optical axis 210 to produce further stimulated emission in the gain medium 202. Up to where the gain medium 202 reaches depletion conditions, the number of stimulated emissions generated by the gain material will be proportional to the number of photons directed back to the medium by PCM 206. Photons traversing a particular correlation path through the cavity generate stimulated emissions that traverse the same path. Thus, resonant cavity modes build. Increased numbers of photons propagate back through gain medium 202 to the output coupler 204. Then, depending upon the reflectivity of the coupler 204, some percentage of photons can be allowed to be transmitted through the coupler while the remainder are reflected back along their incident path or paths to reenter the gain medium 202 and thereby produce further stimulated emissions.

Photons traversing along competing correlation paths will continue to traverse the full cavity length. As the number of photons directed through the gain medium 202 forces the medium to near depletion conditions, the number of correlation paths may decrease. Thus, as round-trip cavity gain decreases towards unity, a dominant correlation path may establish a dominant resonant mode in the cavity. However, it is contemplated that a plurality of paths may continue to exist with each such path having equal or variable field amplitudes in the corresponding cavity modes.

FIG. 8 shows still another embodiment similar to processor 200 shown in FIG. 7. However, in the embodiment of FIG. 7 the correlation path forming elements 212, 214, 216 and 218 are replaced by a multilayer, general interconnection path 310 located within the optical train 312 of system 300. Processor 300 likewise comprises a gain medium 302, an optical coupler 304, a PCM 306, and a beam expander 308. Three consecutive SLMs 314, 316, and 318 provide the interconnection subsystem 310. The SLMs 314, 316, and 318 of subsystem 310 can be encoded to perform any function which can be carried out by processor 10 shown in FIG. 1, processor 100 shown in FIG. 6, and processor 200 shown in FIG. 7. As in the embodiment of FIG. 7, it is contemplated that in processor 300, a preferred path through the cavity is amplified at the expense other paths through the cavity. However, it is likewise contemplated that multiple paths can exist simultaneously.

It is to be understood that there can be various changes and modifications to the preferred embodiments of the present invention disclosed herein, which changes and/or modifications may be made by one of ordinary skill in the art, but such would still result in a system well within the scope of the invention as set forth in the claims.

What is claimed is:

1. A low energy optical processing apparatus in the form of an optical cavity, said apparatus comprising:
    reflecting means for providing at least one end portion of said optical cavity;
    a gain medium excitable into at least a state of fluorescence wherein said medium spontaneously emits light to generate a wavefront which propagates along a path in said cavity;
    first spatial light modulator means, disposed within said path, for imposing a first spatial pattern on a wavefront generated by said gain medium and propagating along said path; and
    second spatial light modulator means, disposed within said path, for imposing a second spatial pattern on a wavefront which has been generated by said gain medium and which has had a first spatial pattern imposed thereon by said first spatial light modulator means, whereby when there is matching between said second spatial pattern imposed by said second spatial light modulator means and said first spatial pattern imposed by said first spatial light modulator means, light spontaneously emitted by said gain medium to generate said wavefront will propagate through said optical cavity and be reflected back to said gain medium by said reflective means to induce stimulated emission in said medium, and when there is substantially no matching between said second spatial pattern and said first spatial pattern, said second spatial light modulating means will substantially prevent light emitted by said gain medium to generate said wavefront to propagate through said cavity and be reflected back to said gain medium.

2. An apparatus as claimed in claim 1, wherein said cavity is a resonance cavity.

3. An apparatus as claimed in claim 1, wherein said reflecting means comprises a phase conjugate mirror.

4. An apparatus as claimed in claim 3, further comprising transformation means in said optical cavity, said transformation means comprising a Fourier lens.

5. An apparatus as claimed in claim 1, wherein one of said first spatial light modulating means and said second spatial light modulating means comprises a phase conjugate mirror means.

6. An apparatus as claimed in claim 1, further comprising third spatial light modulating means, disposed within said path, for imposing a third spatial pattern on a wavefront having a second spatial pattern imposed thereon by said second spatial light modulating means.

7. An apparatus as claimed in claim 6, wherein said reflecting means comprises a phase conjugate mirror.

8. An apparatus as claimed in claim 1, wherein said apparatus further comprises photodetection means disposed to respond to light transmitted thereto from said optical cavity.

9. An apparatus as claimed in claim 8, wherein said photodetection means comprises optical means for spectral classification.

10. An apparatus as claimed in claim 1, further comprising shutter means disposed in said optical cavity for selectively obstructing said optical path through said cavity when said shutter means is closed and opening said path when said shutter means is open.

11. An apparatus as claimed in claim 10, wherein said shutter means comprises a spatial light modulator.

12. An apparatus as claimed in claim 11, wherein said shutter means comprises an acousto-optic device.

13. An apparatus as claimed in claim 11, wherein said shutter means comprises a magneto-optic device.

14. An apparatus as claimed in claim 1, wherein said cavity is tunable to a stability point, said cavity being detunable from said stability point by perturbation of a wavefront generated by spontaneously emitted photons from said gain medium.

15. An extremely low energy processing method utilizing an optical cavity defined by a gain medium and two reflective means, said method comprising the steps means of:
    exciting said gain medium into a state of fluorescence so that said medium spontaneously emits photons to generate a wavefront propagating along an optical path within said cavity;
    in said cavity, imposing a first spatial pattern on said wavefront to provide a first-imposed pattern wavefront;
    in said cavity, imposing a second spatial pattern on said patterned wavefront to provide a second-imposed pattern wavefront which propagates through said cavity when there is matching between said first spatial pattern and said second spatial pattern, and which prevents propagation of said first-imposed pattern wavefront when there is substantially no matching between said first spatial pattern and said second spatial pattern; and
    detecting whether stimulated emission induced by light reflected from one of said reflective means is present in said gain medium to indicate that there is matching between said first and second spatial patterns when stimulated emission is detected in said gain medium, and to indicate that there is substantially no matching between said first and second spatial patterns when there is substantially no stimulated emission detected in said gain medium.

16. An extremely low energy processing method as claimed in claim 15, wherein said step of detecting comprises detecting resonance in said cavity.

17. An extremely low energy processing method as claimed in claim 16, comprising the step of tuning said cavity to have a stability point prior to imposing spatial patterns on said wavefront generated by said gain medium.

18. An extremely low energy processing method as claimed in claim 15, wherein one of said two reflective means comprises phase conjugate reflective means.

19. An extremely low energy processing method as claimed in claim 15, wherein said step of detecting comprises determining photon arrival statistics with time.

20. An extremely low energy processing method as claimed in claim 15, wherein said step of detecting comprises determining lobe structures of modes amplified in said cavity by stimulated emission in said gain medium.

21. An extremely low energy processing method as claimed in claim 15, wherein said step of detecting comprises determining spectral classification of photons generated by stimulated emission in said gain medium.

* * * * *